United States Patent [19]
Haas et al.

[11] 4,037,932
[45] July 26, 1977

[54] ELECTROOPTIC-PHOTOCONDUCTOR SANDWICH USING ACTINIC READOUT LIGHT

[75] Inventors: Werner E. L. Haas, Webster; Gary A. Dir, Fairport, both of N.Y.

[73] Assignee: Xerox Corporation, Stamford, Conn.

[21] Appl. No.: 682,880

[22] Filed: May 3, 1976

[51] Int. Cl.² .............................................. G02F 1/13
[52] U.S. Cl. .............................. 350/160 LC; 350/150; 250/213 R
[58] Field of Search ............ 350/150, 160 R, 160 LC; 250/213 R

[56] References Cited
U.S. PATENT DOCUMENTS

| | | | |
|---|---|---|---|
| 3,803,408 | 4/1974 | Assouline et al. | 350/160 LC X |
| 3,944,332 | 3/1976 | Tutihasi et al. | 350/160 LC |

*Primary Examiner*—Edward S. Bauer
*Attorney, Agent, or Firm*—James J. Ralabate; Richard A. Tomlin; George J. Cannon

[57] ABSTRACT

An optically addressed light valve is disclosed which is cabable of being read-out at very high light intensities during the write-in cycle without need for an optical blocking layer. The system is based on the combination of a reflective photoconductor and an electro-optically active medium and exploits the characteristics of space charge limited currents in photoconductors of high optical absorption of actinic wavelengths.

25 Claims, 6 Drawing Figures

ELECTROOPTIC-PHOTOCONDUCTOR SANDWICH USING ACTINIC READOUT LIGHT

BACKGROUND OF THE INVENTION

This invention relates to optically addressed light valves and more specifically to real-time reflective light valves without optical blocking layers.

With the rapid advance in imaging process techniques, several types of optically addressed light valves are now practical. Desirably such light valves should be simple, i.e., have the least possible number of layers, and permit readout during the write-in cycle. The intensity of the readout light should exceed the write-in intensity, which preferably is small, by many orders of magnitude.

Several types of light valves are described in the patent and scientific literature. In general, such light valves consist of a photoconductor in series with an electro-optic medium such as a liquid crystal, ferroelectric or the like. The photoconductor is under electrical bias and light imagewise incident on it effectively causes its resistance to decrease in the exposed area. This results in imagewise changes in the field across the electro-optic medium which in turn can be read out or projected.

It has heretofore been accepted that prevention of image washout by the readout light would require either readout with light of wavelengths to which the photoconductor is insensitive or, alternately, insertion of an electrically conductive optical blocking layer between the electro-optic medium and photoconductor. Both cases are discussed in the literature. For the type of light valve in which the readout light is of a wavelength which does not affect the photoconductor see for example an article in Applied Physics Letters for July 15, 1970 by J. D. Margerum, J. Nimoy and S. Y. Wong, entitled "Reversible Ultraviolet Imaging with Liquid Crystals." The photoconductor is zinc sulfide, the electro-optic medium a liquid crystal and the electro-optic effect dynamic scattering. The light valve is addressed with ultraviolet light to which the photoconductor is sensitive and read out with visible light to which it is insensitive.

Another example can be found in U.S. Pat. No. 3,592,527 by Gary H. Conners and Paul B. Mauer entitled "Image Display Device," who use poly-n-vinylcarbazole or triphenylamine as the photoconductor, and liquid crystals as the electro-optic media. The light valve is addressed with ultraviolet light and read out with light not containing ultraviolet. Examples of the use of optical blocking layers to prevent readout light from reaching the photoconductor can also be found in the literature. For example, an article by J. R. Maldonado and L. K. Anderson in IEEE Transactions on Electron Devices, Vol. ED-18, No. 9, 1971 entitled "Strain-Biased Ferroelectric-Photoconductor Image Storage and Display Devices Operated in a Reflection Mode" describes an "opaque resistive sea to provide complete light isolation between the writing and reading sides of the device." The light valve consists essentially of a ferroelectric ceramic whose optical properties are controlled by an imagewise exposed photoconductor.

More recently, in an article entitled "AC Liquid-Crystal Light Valve" by T. D. Beard, W. P. Bleha and S. Y. Wong which appeared in Applied Physics Letters of February 1, 1973, cadmium sulfide is used as the photoconductor, and a liquid crystal as the electro-optic medium. To separate the write-in light from the readout light, an optical blocking layer of cadmium telluride is used in conjunction with a dielectric mirror.

In new and growing areas of technology, new methods, apparatus, compositions and articles of manufacture are often discovered for the application of the new technology in the new mode.

SUMMARY OF THE INVENTION

It is, therefore, an object of this invention to provide a novel imaging system.

It is a further object of this invention to provide a novel optically addressed light valve with reflective readout and without an optical blocking layer.

It is another object of the invention to provide an optically addressed light valve which can be readout during the write-in cycle without need for an optical blocking layer to separate the reading from the writing light.

It is another object of the invention to provide an optically addressed imaging system which utilizes the existence of space charge limited currents in conjunction with absorption characteristics of photoconductors.

It is a further object of the invention to provide an imaging system which utilizes space charge limited currents and absorption characteristics of photoconductors to control an electro-optic medium.

It is still another object of the invention to provide an imaging system which utilizes space charge limited currents and absorption characteristics of photoconductors to control the electro-optic characteristics of a liquid crystal.

It is another object of the invention to provide an imaging system which utilizes space charge limited currents and absorption characteristics of photoconductors to control the electro-optic characteristics of a liquid crystal providing optical storage capability.

It is still another object of the invention to provide an imaging system which utilizes space charge limited currents and absorption characteristics of photoconductors to control the electro-optic characteristics of a ferroelectric material.

It is yet another object of the invention to provide an imaging system which utilizes space charge limited currents and absorption characteristics of photoconductors to control the electro-optic characteristics of a Pockels crystal.

The above described and other objectives and advantages are realized in accordance with the practice of present invention by utilizing the absorption characteristics of photoconductors in conjunction with space charge limited currents to remove the need for optical blocking layers in imaging systems employing a photoconductor and electro-optic imaging medium.

It has been generally accepted that optically addressed light valves which are read out during the write-in cycle require either readout with light of wavelengths to which the photoconductor is insensitive or insertion of optically blocking layers between the electro-optic medium and the controlling photoconductive layer. The role of the blocking layer is to prevent washout of the image by the readout light.

In the instant invention no such optical blocking layers are required, yet write-in to readout light ratios of 1:10,000 or larger have been measured.

The device is essentially a four layer sandwich structure consisting of two transparent electrodes and between them the photoconductor, selenium, for example, in series with the electro-optic medium, for example, a liquid crystal.

The device can be operated either with DC or AC bias. In the dark, the photoconductor is high resistive and the electrical field applied across the sandwich drops essentially across the photoconductor. If the readout light is turned on electric carriers are generated by the incident photons, the resistance of the photoconductor drops, current flows and the field across the electro-optic medium increases. If the intensity of the readout light exceeds a certain level the current saturates, i.e., becomes space charge limited. Further increase in light intensity adds little to the current flow. For a detailed description of space charge limited current in selenium see, for example, an article by Paul K. Weimer and A. Danforth Cope in the September, 1951 issue of RCA Review.

The photoconductor selenium has a very high optical absorption coefficient for wavelengths to which it is actinic, i.e., photosensitive. In virtue of this high absorption coefficient to actinic light, carrier generation by the readout light can only take place near the surface. For example, a 1.0 micron thick selenium film attenuates green light of 5500A wavelength by a factor of $\simeq 3000$ whereas nonactinic red light of 7000A wavelength is only attenuated by about 1%.

If imaging light strikes the surface of the photoconductor at the side opposite to the side illuminated by the readout light, additional carriers are generated which add to the space charge limited current modulating the field across the electro-optic medium. The medium in turn responds to the imagewise modulated field producing a viewable image.

Several conditions have to be met for good functioning of the device. First the existence of space charge limited currents is required because without saturation of the current with increasing light intensities it would be impossible to use very intense readout sources. The current would increase to a value where the comparatively weak imaging light could not modulate significantly the current flow. Second, actinic components of the readout light should not reach the surface where the imaging light is incident. If actinic light from the readout source would reach the opposite side of the photoconductor it would generate carriers just as the imaging light does. For this reason, in order to prevent significant interference between the readout light and the imaging light it is therefore desirable that the optical absorption of the photoconductor be sufficient to reduce the intensity of the actinic components of the readout light to at least about one-third and preferably about 10% of the intensity of the write-in light. This requirement imposes boundary conditions on the photoconductor used and its thickness which are best illustrated by example. For example, let it be assumed that the readout light contains 10.0 mw/cm$^2$ of actinic components, and that the write-in or imaging light has an actinic energy density of 5.0 $\mu$w/cm$^2$. If a signal to noise ratio of 10 can be tolerated the energy density of the actinic component reaching the imaging side must be reduced to 5.0 $\mu$w/cm$^2$/10 or 0.5 $\mu$w/cm$^2$. Since the readout energy density of 10.0 mw/cm$^2$ an absorption of 10.0 mw/cm$^2$/0.5 $\mu$w/cm$^2$ = 2 × 10$^4$ is required. If we assume an absorption coefficient of 10$^4$ cm$^{-1}$ of the film thickness must therefore be about 10.0 microns. For a hypothetical absorption coefficient of, say, 10$^2$ cm$^{-1}$, a film thickness of 1000.0 microns would be required to maintain the signal to noise ratio of 10 to 1. Conversely, a film thickness of only 10.0 microns with an absorption coefficient of 10$^2$ cm$^{-1}$ would attenuate the readout light only by a factor of 10%, i.e., to an energy density of 9.0 mw/cm$^2$, and therefore the readout light reaching the imaging side would completely swamp the 5.0 $\mu$w/cm$^2$ imaging light. Third, since the space charge limited current is fairly high compared to the current generated by the weak imaging light the relative modulation is small and to generate a good image it is desirable to have an electro-optic medium which responds to small increments in electric field with substantial optical changes. Several electro-optic effects in liquid crystals and ferroelectrics satisfy this requirement. For example, satisfactory effects include the cholesteric to nematic phase transition, dynamic scattering, twisted nematics and Freederick's transition in liquid crystals. Ferroelectrics include ceramics, single crystals and Pockel's crystal. These effects are known in the art.

Further, the intensity of readout light I emerging from the photoconductor is related to the intensity of readout light $I_o$ striking the other side of the photoconductor by the equation: $I = I_o e^{-at}$, where $a$ is the coefficient of absorption of the photoconductor and $t$ is the thickness of the photoconductor. Knowing the desired values of I and $I_o$ and easily determining or finding the published value of $\alpha$ for any photoconductor, one can calculate the thickness required to obtain the space charge current limiting effect employed in the invention for any desired photoconductor.

Thus, the suitability of materials and parameters proposed to be utilized in practicing the present invention are predictable.

BRIEF DESCRIPTION OF THE DRAWINGS

For a better understanding of the invention as well as other objects and further features thereof, reference is made to the following detailed disclosure of the invention taken in conjunction with the accompanying drawing wherein.

DESCRIPTION OF THE PREFERRED EMBODIMENTS

Figure 1:
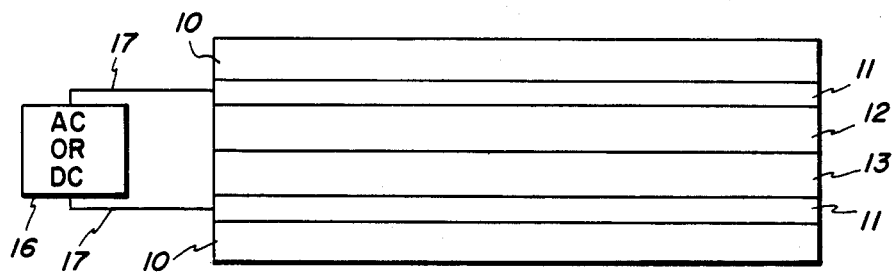
FIG. 1 is a partially schematic, partially cross-sectional view of one embodiment of a light valve according to the invention.

In FIG. 1 a typical relative light valve 1 is shown in cross-section wherein a pair of transparent plates 10 having substantially transparent conductive coatings 11 upon the contact surface, comprise a parallel pair of substantially transparent electrodes. A photoconductive member 12 is adjacent to one transparent coating 11 and an electro-optic medium 13 is adjacent to the photoconductive member 12 and the other transparent coating 11.

An electrical field is created between the electrodes by an external circuit 14 which typically comprises a source of potential 16 which is connected across the two electrodes through leads 17. The potential source may be either DC, AC, DC biased AC, square wave, sawtooth, or a combination thereof.

Figure 2:
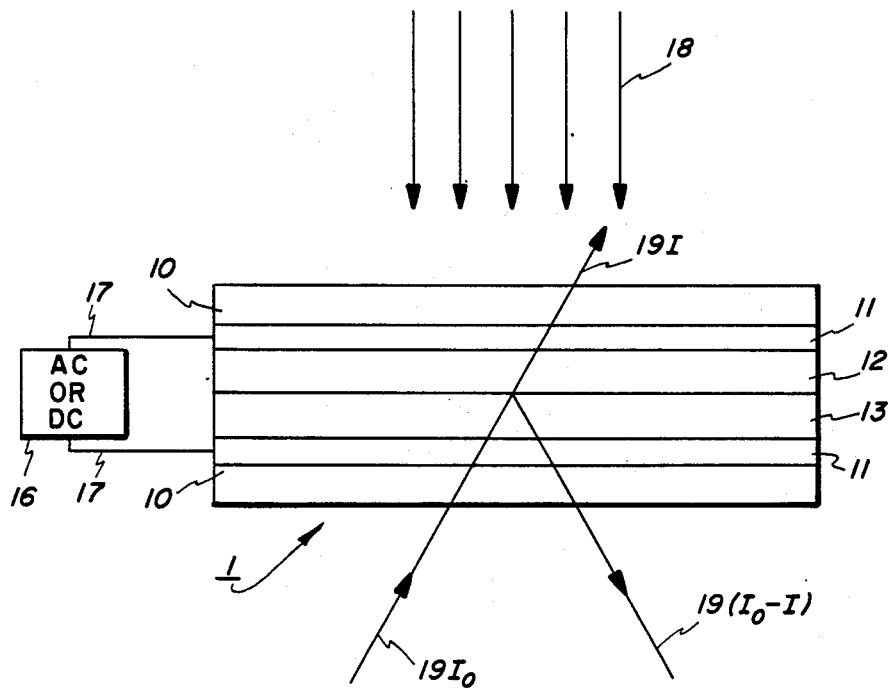
FIG. 2 is a partially schematic, partially cross-sectional view of one embodiment of a light valve according to the invention showing the incident imaging and readout lights.

In FIG. 2 a typical reflective light valve is shown together with the imaging light 18 and the readout light 19. In the surprising and avantageous system of the present invention it has been discovered that even with weak imaging light energies the image can be viewed or readout at very high light intensities. This is due to the absorption characteristics of the photoconductive member 12 and the existence of space charge limited currents.

In the liquid crystal imaging members described in FIG. 1, the electrodes may be of any suitable transparent conductive material. Typical suitable transparent, conductive electrodes include glass or plastic substrates 10 having substantially transparent and continuously conductive coatings 11 of conductors such as tin, indium oxide, aluminum, chromium, tin oxide, or any other suitable conductor. These substantially transparent conductive coatings are typically evaporated onto the more insulating, transparent substrate. NESA glass, a tin oxide coated glass manufactured by the Pittsburgh Plate Glass Company, is a commercially available example of a typical transparent, conductive electrode material.

The photoconductive member 12 in FIG. 1 may comprise any reflective photoconductive film with high optical absorption for actinic light. Good, but by no means exclusive, examples of suitable photoconductive films are selenium and members of the selenium-arsenic family. Typically such films are preferably produced by vacuum evaporation since the surface becomes sufficiently reflective. Polishing could also be employed for this purpose. The film thickness is in general dictated by the absorption characteristics of the film and the intensities of the write-in and readout lights, and without being limited, falls typically in the range of about 1 to about 1000 microns. The electro-optic medium 14 may comprise a liquid crystal, a ferroelectric single crystal or ferroelectric ceramic or the like.

A number of liquid crystal electro-optic effects can be exploited for operation of the reflective light valves. One example of such electro-optic effects is the cholesteric nematic phase transition described in U.S. Pat. No. 3,718,380 by Wysocki, et al. A scattering cholesteric liquid crystal film becomes clear upon application of an electric field of sufficient strength and returns to the scattering state after field removal. Typical liquid crystal mixtures exhibiting this effect have their molecules arranged in the helical fashion of cholesterics and possess overall positive dielectric anisotropy. The optical contrast between transformed and nontransformed regions is sufficient for direct viewing but can be further enhanced by polarizing optics.

A further liquid crystal electro-optic effect suitable for exploitation in the instant invention is the so-called "twisted nematic" effect described by M. Schadt and W. Helfrich in Applied Physics Letters of Feb. 15, 1971. Nematic liquid crystals of overall positive dielectric anisotropy are forced mechanically into a helical arrangement which is broken up by an applied electric field. The effect is analogous to the cholesteric-nematic phase transition; after field removal the molecules return to the helical arrangement. Since both states are non-scattering, polarizing aids are required to generate a viewable image.

A further liquid crystal effect suitable for exploitation in the present invention is the so-called "dynamic scattering" effect described by G. H. Heilmeier, L. A. Zanoni and L. A. Barton in the Proceedings of the IEEE of July, 1968. In dynamic scattering, which occurs in nematic liquid crystals, current flow through a thin film produces violent turbulence which ceases if the current flow stops. No polarizing aids are used with this effect. Yet another liquid crystal effect which can be exploited is the so-called Freederick's transition in which initially aligned nematic molecules are tilted perpendicular to the field if they are dielectrically negative or parallel to the field if they are dielectrically positive. Polarizing aids are required to view the effect.

Ferroelectric ceramics are yet another electro-optic medium which can be used in the present invention. In an article by Cecil E. Land and Philip D. Thacher in Proceedings of the IEEE of May, 1969 the applications of ferroelectric in electro-optics are discussed in detail and several electro-optic effects are discussed. Layer 13 can be a ferroelectric ceramic layer. In yet a further embodiment layer 13 can be a ferroelectric simple crystal as described, for example, by S. E. Cummings and T. H. Luke in IEEE Transactions on Electron Devices, Volume ED-18 of September, 1971. A simple crystal of ferroelectric bismuth titanate is utilized as electro-optic medium. Single crystals exhibiting the Pockels effect are another class of electro-optic media suitable to function as layer 13. Pockels crystals may or may not be ferroelectric but all exhibit the so-called Pockels effect which is a linear change in birefringence with applied electric field. For a more detailed discussion, see for example, an article by D. H. Pritchard which appeared in RCA Review of December, 1969.

Figure 3:
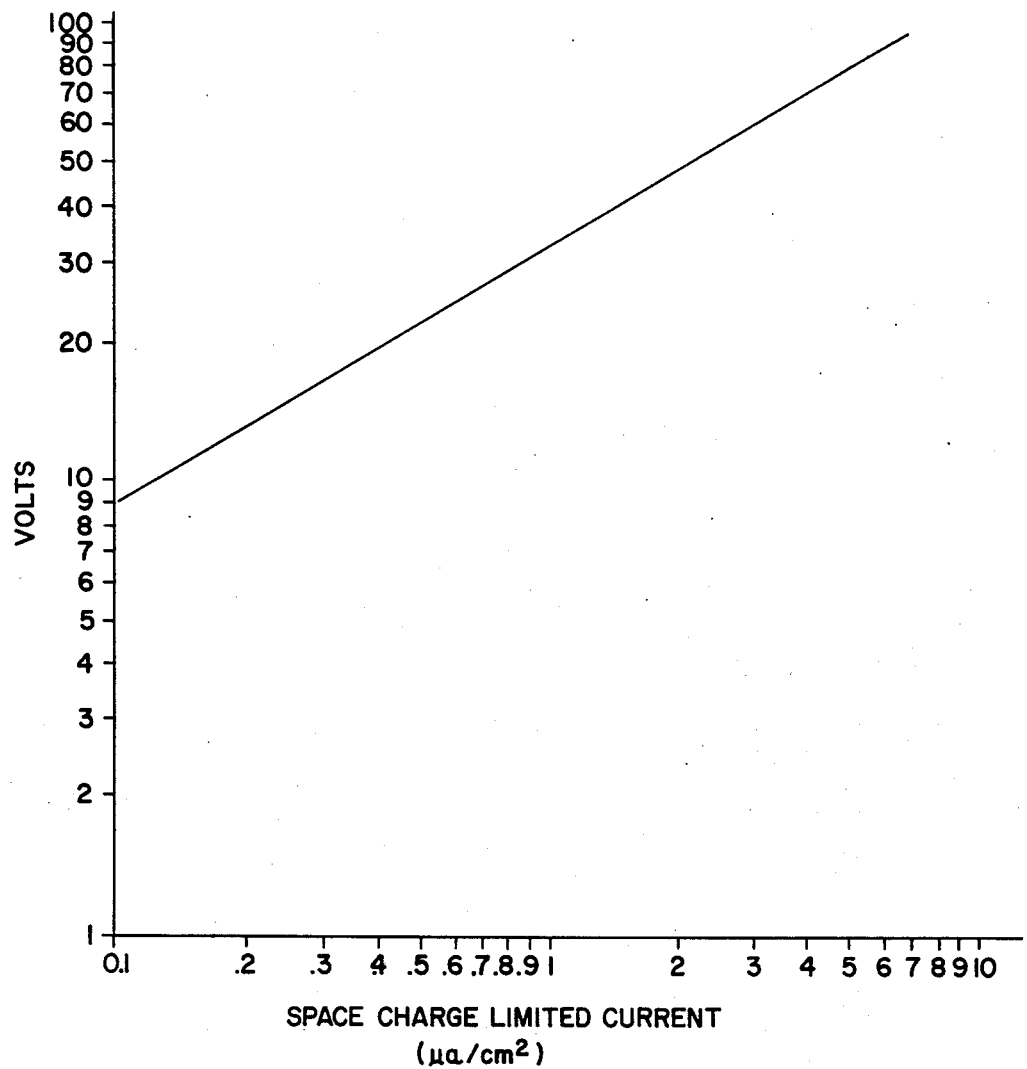
FIG. 3 is a voltage versus current plot illustrating the space charge limited currents in 4.7 micron thick selenium as a function of voltage when irradiated with white readout light from a 150 W Xenon light source.

In FIG. 3 a voltage versus current plot is shown which illustrates the approximate $V^2$ relationship of voltage and current which is typical for space charge limited currents.

Figure 4:
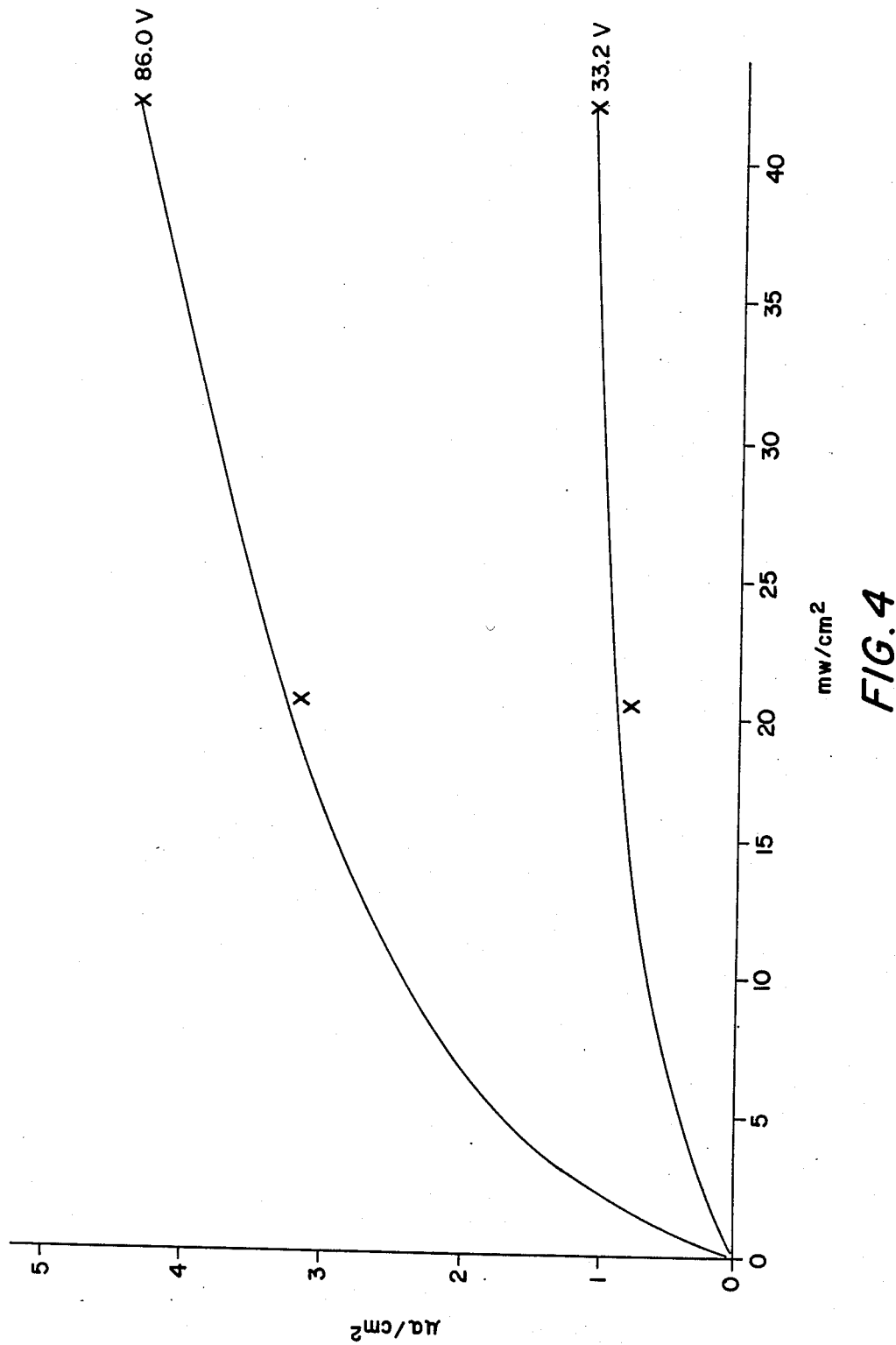
FIG. 4 is a plot of the space charge limited current versus incident power density, for two applied voltages, for a selenium layer about 4.7 microns in thickness.

In FIG. 4 plots of current versus incident readout light for two voltage levels are illustratively characteristic of space charge limited currents.

Figure 5:
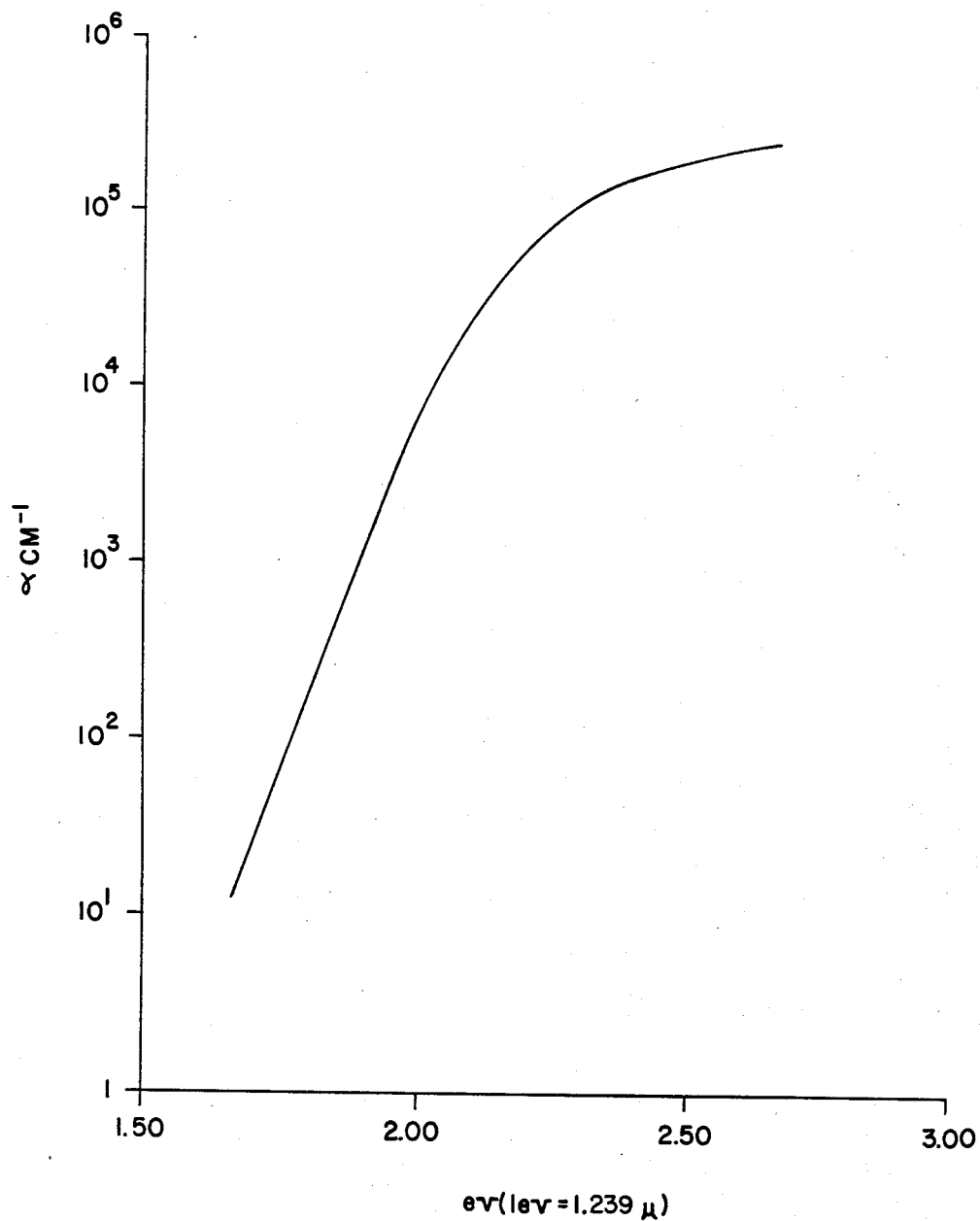
FIG. 5 is a plot of the absorption coefficient of selenium versus wavelength in eV.

In FIG. 5, the absorption coefficient for selenium is plotted versus wavelength. Selenium is a good example of a suitable photoconductor for the reflective light valve described in this invention.

In yet another embodiment, a dielectric mirror was inserted between the photoconductive member 12 and the electro-optic medium 13. The function of this dielectric mirror is to enhance the reflectivity of the electro-optic - photoconductor interface, thus relieving the requirement for high reflectance of the photoconductor. The dielectric mirror had adequate electrical conductivity and typically comprises four alternate layers, two of silicon dioxide and two of titanium dioxide. The total thickness is about 2800A and the reflectivity 68% at 5600A wavelength. Eight layer dielectric mirrors have also been used successfully in the present invention. Typically such mirrors have a total thickness of about 5600A and a reflectivity of 83%.

It is another surprising aspect of this invention that optical light valves using the cholesteric-nematic phase transition are capable of storing images if the voltage supply is suddenly disconnected. If, for example, an image from a television is projected onto the light valve a moving image can be seen. Suddent removal of the voltage source results in storage of the image, which is retained for several hours. Reactivation of the light valve results in immediate image erasure. It is tentatively believed that this surprising phenomenon is related to results reported by Greubel, et al in Molecular Crystals and Liquid Crystals of October, 1972. These authors reported that certain dielectrically positive cholesteric mixtures had different textures in cells which underwent the cholesteric-nematic phase transition compared to cells subjected to lower fields.

The following examples further specifically describe preferred embodiments of the present invention.

EXAMPLES

In all Examples the transparent electrodes are flat square plane plates coated on one side with indium oxide. Each of the oxide coatings are provided with an electrical lead for connection to a terminal of a suitable voltage source.

EXAMPLE I

An optical light valve was constructed having a 4.7 micron thick vacuum evaporated photoconductive selenium layer and a 0.5 mil thick liquid crystal layer as electro-optic medium. The composition of the liquid crystal layer was 1 part by weight cholesteryl oleyl carbonate and 2 parts by weight of p'-pentyl-p-cyanobiphenyl. One side of the cell was illuminated with a focused beam of a 150 W Xenon light source having a power density of about 100 mw/cm$^2$. On the opposite side an image from a TV set was projected. A moving image could be seen in the electro-optic medium in reflection upon application of about 100 V DC. This image in turn was projected on a 3 by 3 foot screen. The electro-optic effect is the cholesteric-nematic phase transition.

EXAMPLE II

An optical light valve was constructed having a 4.7 micron thick vacuum evaporated photoconductive selenium layer and a 0.5 mil thick liquid crystal layer as electro-optic medium. The composition of the liquid crystal layer was 1 part by weight cholesteryl oleyl carbonate and 2 parts by weight of p'-pentyl-p-cyanobiphenyl. One side of the cell was illuminated with a focused beam of a 150 W Xenon light source having a power density of about 100.0 mw/cm$^2$. On the opposite side an image from a TV set was projected. A moving image could be seen in the electro-optic medium in reflection upon application of about 120 V peak AC at 10 cycles per second. This image effect is the cholesteric-nematic phase transition.

EXAMPLE III

An optical light valve was constructed having a 4.7 micron thick vacuum evaporated photoconductive selenium layer and a 0.5 mil thick liquid crystal layer as electro-optic medium. The composition of the liquid crystal layer was 1 part by weight cholesteryl oleyl carbonate and 2 parts by weight of p'-pentyl-p-cyanobiphenyl. One side of the cell was illuminated with a focused beam of a 150 W Xenon light source having a power density of about 150.0 mw/cm$^2$. On the opposite side an image from a TV set was projected. A moving image could be seen in the electro-optic medium in reflection upon application of about 80 V peak square wave. This image in turn was projected on a 3 by 3 foot screen. The electro-optic effect is the cholesteric-nematic phase transition.

EXAMPLE IV

An optical light valve was constructed having a 6.0 micron thick vacuum evaporated photoconductive arsenic triselenide layer and a 0.5 mil thick crystal layer as electro-optic medium. The composition of the liquid crystal layer was 1 part by weight cholesteryl oleyl carbonate and 2 parts by weight of p'-pentyl-p-cyanobiphenyl. One side of the cell was illuminated with a focused beam of 150 W Xenon light source having a power density of about 100.0 mw/cm$^2$. On the opposite side an imae from a TV set was projected. A moving image could be seen in the electro-optic medium in reflection upon application of about 100 V peak AC at 10 cycles per second. This image in turn was projected on a 3 by 3 foot screen. The electro-optic effect is the cholesteric-nematic phase transition.

EXAMPLE V

An optical light valve was constructed having a 6.0 micron thick vacuum evaporated photoconductive arsenic triselenide layer and a 2.0 mil thick liquid crystal layer as electro-optic medium. The composition of the liquid crystal layer was 1 part by weight cholesteryl oleyl carbonate and 2 parts by weight of p'-pentyl-p-cyanobiphenyl. One side of the cell was illuminated with a focused beam of a 150 W Xenon light source having a power density of about 100 mw/cm$^2$. On the opposite side an image from a TV set was projected. A moving image could be seen in the electro-optic medium upon application of about 300 V DC. This image in turn was projected on a 3 by 3 foot screen. The electro-optic effect is the cholesteric-nematic phase transition.

EXAMPLE VI

An optical light valve was constructed having a 4.7 micron thick vacuum evaporated photoconductive selenium layer and a 0.5 mil thick liquid crystal layer as electro-optic medium. The composition of the liquid crystal layer was methoxybenzylidene-butylaniline (MBBA). One side of the cell was illuminated with a focused beam of a 150 W Xenon light source having a power density of about 100 mw/cm$^2$. On the opposite side an image from a TV set was projected. A moving image could be seen in the electro-optic medium in reflection upon application of about 20 V DC. This image in turn was projected on a 3 by 3 foot screen. The electro-optic effect is dynamic scattering.

EXAMPLE VII

An optical light valve was constructed having a 4.7 micron thick vacuum evaporated photoconductive selenium layer and a 0.5 mil thick liquid crystal layer as electro-optic medium. The composition of the liquid crystal layer was methoxybenzylidene-butylaniline (MBBA). One side of the cell was illuminated with a focused beam of a 150 W Xenon light source having a power density of about 100 mw/cm$^2$. On the opposite side an image from a test target was projected. An image could be seen in the electro-optic medium in reflection upon application of about 20 V DC. This image in turn was projected on a 3 by 3 foot screen. The electro-optic effect is dynamic scattering.

EXAMPLE VIII

An optical light valve was constructed having a 4.7 micron thick vacuum evaporated photoconductive selenium layer and a 0.5 mil thick liquid crystal layer as electro-optic medium. The composition of the liquid crystal layer was 1 part by weight cholesteryl oleyl carbonate and 2 parts by weight of p'-pentyl-p-cyanobiphenyl. One side of the cell was illuminated with a focused beam of a 150 W Xenon light source having a power density of about 100 mw/cm$^2$. On the opposite side an image from a TV set was projected. A moving image could be seen in the electro-optic medium in transmission upon application of about 100 V DC. This image in turn was projected on a 3 by 3 foot screen. The electro-optic effect is the cholesteric-nematic phase transition.

EXAMPLE IX

An optical light valve was constructed having a 6.0 micron thick vacuum evaporated photoconductive arsenic-triselenide layer and the 4 layer dielectric mirror (previously described) between the photoconductor and the electro-optic liquid crystal film. The liquid crystal film was 0.5 mil thick and its composition was 1 part by weight oleyl cholesteryl carbonate and 2 parts p'-pentyl-p-cyanobiphenyl. One side of the cell was illuminated with a focused beam of a 150 W Xenon light source having a power density of about 100 mw/cm$^2$. On the opposite side an image from a TV set was projected. A moving image could be seen in the electro-optic medium upon application of about 85 V peak at 12 cycles per second. This image in turn was projected on a 3 by 3 foot screen.

EXAMPLE X

An optical light valve was constructed having a 6.0 micron thick vacuum evaporated photoconductive arsenic triselenide layer and a 0.5 mil thick liquid crystal layer as electro-optic medium. The composition of the liquid crystal layer was 1 part by weight cholesteryl oleyl carbonate and 3 parts by weight of p'd-pentyl-p-cyanobiphenyl. One side of the cell was illuminated with a focused beam of a 150 W Xenon light source having a power density of about 100 mw/cm$^2$. On the opposite side an image from a TV set was projected. A moving image could be seen in the electro-optic medium upon application of about 85 V DC. This image in turn was projected on a 3 by 3 foot screen. The voltage was suddenly removed and the image remained stored.

EXAMPLE XI

An optical light valve was constructed having a 6.0 micron thick vacuum evaporated photoconductive arsenic-triselenide layer and a 0.5 mil thick liquid crystal layer as electro-optic medium. The composition of the liquid crystal layer as 10 parts by weight of TN-100 (Hoffmann LaRoche) and 4 parts by weight of cholesteryl oleyl carbonate. One side of the cell was illuminated with a focused beam of a 150 W Xenon light source having a power density of about 100 mw/cm$^2$. On the opposite side an image from a TV set was projected. A moving image could be seen in the electro-optic medium upon application of about 150 V. This image in turn was projected on a 3 by 3 foot screen. The electro-optic effect is the cholesteric-nematic phase transition.

One particularly important aspect of the present invention is that the underlying principles involved can be applied to any photoconductor with the use of readin and readout light which is actinic to the photoconductor. Typical photoconductive materials include photoconductive inorganic materials and photoconductive organic materials. Typical suitable inorganic photoconductive materials include sensitized zinc oxide, for example, sensitized by the addition of Rodamine Dye, available from Dupont, selenium, selenium alloyed with arsenic such as, for example, arsenic triselenide, tellurium, antimony, or bismuth; cadmium sulfide, cadmium sulfoselenide, and the many other typical suitable inorganic photoconductive materials listed in U.S. Pat. No. 3,121,006 to Middleton et al and listed in U.S. Pat. No. 3,288,603, both of which patents are hereby incorporated by reference. Typical suitable organic photoconductive materials include, for example, the combination of 2,5-bis(p-aminophenyl)-1,3,4-oxadiazole available under the trademark TO 1920 from Kalle and Company, Wiesbaden-Biebrich, Germany and Vinylite VYNS, a copolymer of vinyl chloride and vinyl acetate, available from Carbide and Carbon Chemicals Company; and the combination of 2,4,7,trinitro-9-fluorenone to polyvinylcarbazole, available under the trademark Luvican 170 from Winter, Wolf and Company, New York, N.Y. The thickness of the photoconductive layer is not critical to the practice of the invention provided only that the thickness is sufficient to provide the desired relationship between I and $I_o$ as previously mentioned.

Particularly preferred photoconductive materials include selenium alloy photoconductive materials. These are preferred because of their high coefficient of absorption with respect ot actinic radiation which allows greater amounts of readout light and therefore better images. Typical selenium and selenium alloy compounds include crystalline selenium; amorphous selenium; amorphous selenium alloyed with arsenic, tellurium, antimony, bismuth, etc.; amorphous selenium or its alloys doped with halogens; and one or more crystalline forms of selenium including the monoclinic and hexagonal forms.

Figure 6:
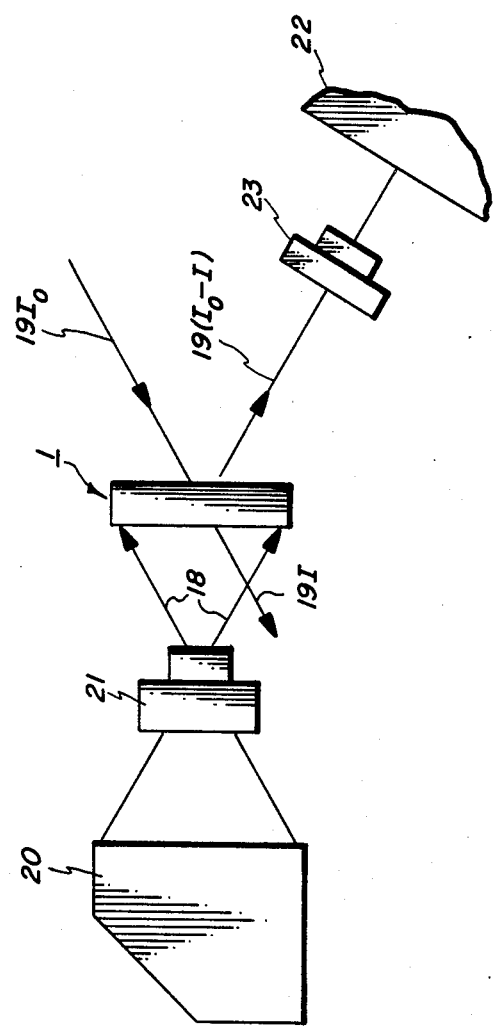
FIG. 6 is a television projection system using a light valve according to this invention.

Another important aspect of the present invention is that real-time imaging and projection can be readily achieved. For example, those Examples previously set forth in which television projection occurred were conveniently and easily achieved by inserting (referring now to FIG. 6) a lens 21 which optically focused the image from television receiver 20 onto the light valve 1. An intense readout light 19 $I_o$ was reflected from the light valve and focused by lens 23 onto screen 22.

It will be apparent to those skilled in the art that many embodiments and many utilizations of the present invention can be achieved.

For example, in addition to use as a projection display, the present invention can be utilized as a light intensifier to intensify an original image for imaging xerographic plates, photographic film, etc.; it could also for example, be used as an image converter to convert ultraviolet images to visible images, X-rays to visible rays, incoherent light images to coherent light images, and so forth.

Further, the present imaging system can utilize many sources of original image optical input such as microfilm continuous tone positives, screened positives, negatives and so forth, in addition to real-time input.

What is claimed is:

1. An imaging method comprising:
   a. providing, without an optical blocking layer therebetween, a photoconductive layer and an electro-optic medium in between two electrodes;
   b. applying a voltage between said two electrodes;
   c. striking said photoconductive layer from one side with actinic radiation in imagewise configuration; and
   d. uniformly striking said photoconductive layer from its other side with actinic radiation which is absorbed by said photoconductive layer in an amount effective to limit the intensity of uniform actinic radiation transmitted through said photoconductive layer no greater than about one-third of the intensity of said imagewise configured actinic radiation striking said one side of said photoconductive layer; wherein the amount of uniform actinic radiation absorbed by said photoconductive layer is sufficient to create a space charge limited current within said photoconductive layer.

2. The method according to claim 1 wherein said electro-optic medium comprises a liquid crystalline composition.

3. The method according to claim 2 wherein said liquid crystalline composition undergoes the cholesteric to nematic phase transition.

4. The method according to claim 3 further including the step of removing the voltage applied in step (b).

5. The method according to claim 4 further including the step of applying a voltage subsequent to removal of the voltage applied in step (b).

6. The method according to claim 2 wherein said liquid crystalline composition undergoes dynamic scattering.

7. The method of claim 2 wherein said liquid crystalline composition comprises a twisted nematic.

8. The method of claim 2 wherein said liquid crystalline composition undergoes the Freederick transition.

9. The method of claim 1 wherein said electro-optic medium comprises ferroelectric ceramics.

10. The method of claim 1 wherein said electro-optic medium comprises a ferroelectric single crystal.

11. The method of claim 1 wherein said electro-optic medium comprises a Pockels crystal.

12. The method of claim 1 further including a dielectric mirror in between said photoconductor and said electro-optic medium.

13. The method according to claim 1 wherein said photoconductive layer comprises a material selected from the group consisting of selenium and selenium alloys.

14. The method according to claim 13 wherein said photoconductive layer comprises arsenic triselenide.

15. An imaging device, comprising:
   a. between electrodes, a photoconductive layer and an electro-optic medium without an optical blocking layer therebetween;
   b. means for applying a voltage between said electrodes;
   c. means for illuminating said device from one side of said photoconductive layer with actinic radiation in imagewise configuration; and
   d. means for uniformly illuminating said device from the other side of said photoconductive layer with actinic radiation; said photoconductive layer having a thickness and coefficient of absorption for said actinic radiation effective to establish a space charge limited current upon activation of said means for uniformly illuminating said device.

16. The device of claim 15 wherein said electrooptic medium comprises a liquid crystalline composition.

17. The device of claim 16 wherein said liquid crystalline composition comprises a nematic.

18. The device of claim 17 wherein said nematic is a twisted nematic.

19. The device of claim 16 wherein said liquid crystalline composition comprises a mixture of cholesteric and nematic liquid crystalline materials.

20. The device of claim 15 wherein said electrooptic medium comprises a ferroelectric single crystal.

21. The device of claim 15 wherein said electrooptic medium comprises a ferroelectric single crystal.

22. The device of claim 15 wherein said electrooptic medium comprises a Pockels crystal.

23. The device of claim 15 further including a dielectric mirror in between said photoconductor and said electro-optic medium.

24. The device according to claim 15 wherein said photoconductive layer comprises a material selected from the group consisting of selenium and selenium alloys.

25. The device according to claim 24 wherein said photoconductive layer comprises arsenic triselenide.

* * * * *